INVENTOR.
Franz W. R. Starp
Heinz K. Mutterer
BY Arthur A. March
ATTORNEY

United States Patent Office 3,200,729
Patented Aug. 17, 1965

3,200,729
PHOTOGRAPHIC INTRA-LENS SHUTTER
Franz W. R. Starp, Calmbach (Enz), and Heinz K. Mutterer, Sprollenhaus, Germany, assignors to Alfred Gauthier G.m.b.H., Calmbach (Enz), Germany, a corporation of Germany
Filed May 25, 1962, Ser. No. 197,633
Claims priority, application Germany, May 29, 1961, G 32,365
4 Claims. (Cl. 95—63)

This invention involves a photographic camera having an intra-lens shutter construction and, more specifically, an intra-lens shutter arrangement wherein the movement of the shutter blades between operative and inoperative position is determined and controlled by the aperture setting.

An object of the present invention is to provide an intra-lens shutter assembly having a variable transmission comprising few parts which operatively connect the shutter drive means to the shutter driving ring.

Another object of the present invention is to provide a variable transmission between the shutter drive means and the shutter driving ring whereby the operation and ratio of the transmission means for effecting the operation of the shutter blades responds to the setting of the aperture size.

A further object is to provide an intra-lens shutter assembly having a novel transmission means which is relatively simple in its construction, comparatively inexpensive to manufacture and is positive in operation.

Still another object of the present invention is to provide the intra-lens shutter assembly with positive stop means for limiting the rotary movement of the shutter driving ring at the moment of its reversal.

The foregoing objects are obtained by a novel transmission means operatively connecting the shutter driving means with the shutter driving ring. According to the present invention, the transmission means includes a rocking lever means having one end connected to the driving ring and the other end connected to one end of a driving pawl, with the other end of the driving pawl being pivotally connected to the shutter drive means. The rocking lever, in turn, is pivoted about a pin which is movable in a slot formed intermediate the ends of the rocking lever. An operative connection to the pivot pin is provided for adjusting the position of the pivot pin within the slot in the rocking lever. The position of the pivot pin is influenced by the diaphragm setting member to vary the lever arm ratio.

A feature of this invention resides in the provision of a transmission means interposed between the driving shutter member and a shutter blade driving ring which is positive in operation and which insures a maximum of functional and operational dependability in a minimum of space and with a minimum of structural components.

A further feature of the present invention is the provision of a variable transmission means having few structural parts which minimizes maintenance problems and, in addition, simplifies production with resultant saving in both time and cost in the assembling and manufacturing of cameras embodying the instant invention.

A particularly simple, inexpensive and positive operating transmission means in one form of the invention comprises a one-piece rocker arm which is operatively connected between the shutter driving means and the shutter blade driving ring. In accordance with this invention the rocker arm is pivoted about an articulated pin engaging a slot disposed intermediate the ends of the rocking lever and is rendered adjustable to vary the throw of the rocker arm in response to the setting of the aperture size. This arrangement requires only a simple lever which, in connection with an adjusting lever, permits the desired aperture size of the shutter blades to be reliably set without additional complicated mechanisms and resultant expenditures incident to the manufacture of such complicated mechanisms.

In another form of the invention, especially advantageous kinematic conditions during the running down of the transmission means can be obtained by utilizing a rocker transmission means which comprises two arms pivotally connected to each other at one end thereof. The free end of one arm is operatively connected to the shutter blade driving ring and the free end of the other arm is operatively connected by means of a driving pawl to the shutter driving member. In this form of the invention, the arm connected to the shutter blade driving ring is provided with an elongated slot for receiving an articulated pin, the position of which is made variable by means of a cooperatingly connected adjusting lever. The other arm, which cooperates with the driving pawl of the shutter blade drive means, is pivotally positioned about a fixed axis. The arrangement of this form of the invention makes certain that the activating point of the driving pawl on the transmission means always occupies the same end position independently of the setting of the transmission ratio of the adjusting lever influencing the said transmission means.

Other features and advantages are hereinafter described in connection with the following specification and drawings in which.

Figure 1:
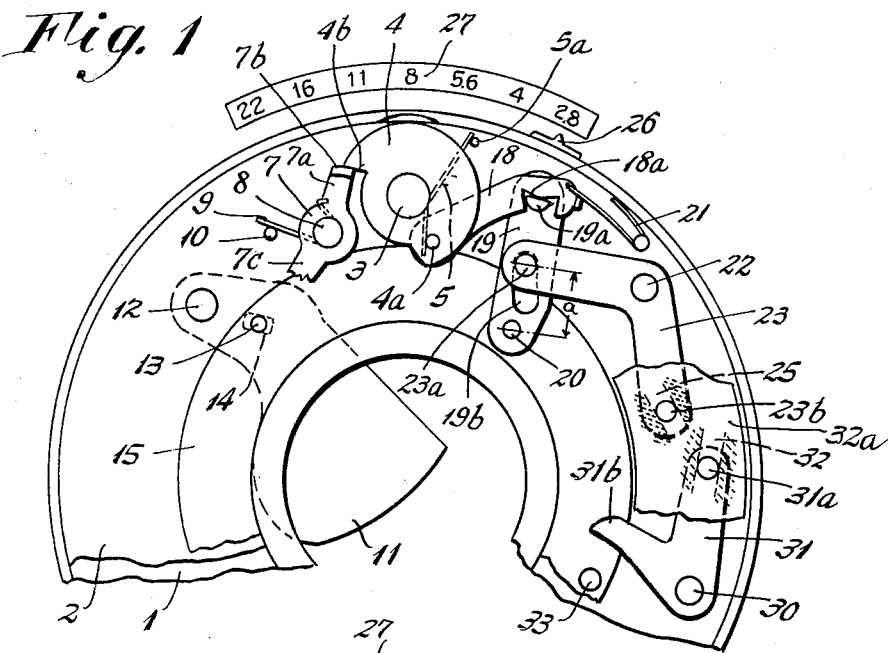
FIG. 1 is a partial elevational view of the intra-lens shutter arrangement embodying the instant invention wherein the camera is shown cocked in the largest diaphragm setting value 2.8, and with the shutter blades in the closed position.
Figure 2:
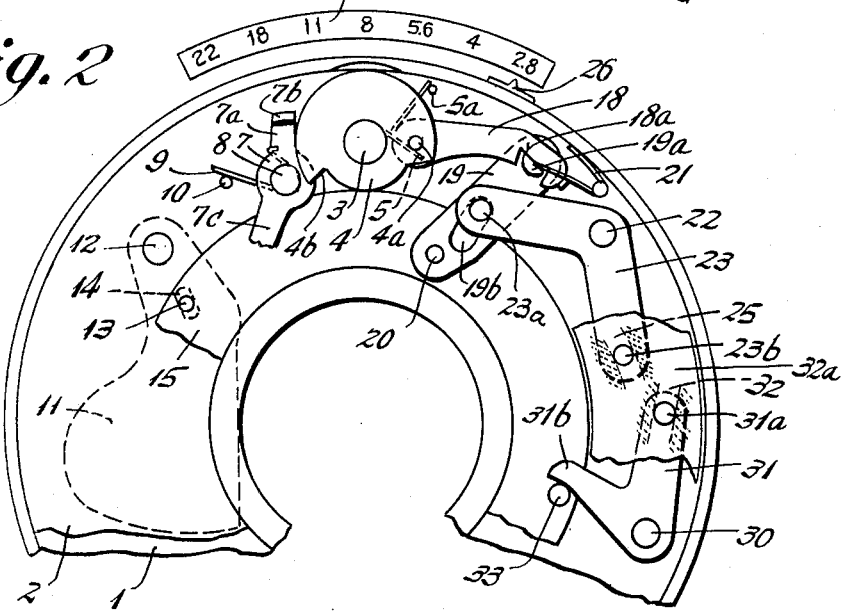
FIG. 2 illustrates a view similar to that of FIG. 1 but illusrating the shutter in its half run-down position.

Referring specifically to the drawings there is shown in FIGS. 1 and 2 a housing 1 of a photographic intra-lens shutter assembly. A base plate 2 is affixed to the shutter housing 1. The base plate is used to position the members of a shutter mechanism. Rotatably positioned about the axis 3 of the base plate 2 is the driving disc 4 of the shutter. The driving disc 4, in turn, is acted upon by a driving spring 5. As shown, the driving spring 5 is arranged on the axis 3 with one end of the spring held in place by a fixed pin 5a and the other end of the spring being positioned by an articulated pin 4a connected to the cocking and driving disc 4.

An arresting lever 7 is provided to retain the driving disc 4 in its cocked position. The arresting lever 7 is pivotally mounted about the axis 8 which is connected to the base plate 2. The arresting lever 7 is influenced by a coil spring 9 which is also disposed about the axis 8. One end of the coil spring engages an arm 7a of the arresting lever and the other end of said coil spring is anchored by a fixed pin 10. When the driving disc 4 is in its cocked position, arm 7a of the arresting lever engages a projection 4b of the driving disc by means of a bent tab 7b. The other arm 7c of the arresting lever cooperates with a shutter release member (not shown) in a well-known manner. Upon actuation of the shutter release member the arm 7a of the arresting lever 7 is moved out of the path of motion of the projection 4b of the driving disc and against the influence of spring 9.

The shutter blades 11 (only one of which is shown for clarity) are rotatably positioned about a fixed pin 12 connected to the base plate 2, and are operatively connected by means of a pin and slot connection 13 and 14 to a driving ring 15. The ring 15 is rotatably mounted and coaxially disposed with respect to the lens axis. Therefore, upon rotation of the driving ring 15, the respective shutter blades 11 swing outwardly and clockwise about their respective pivots 12 from the closed position shown in FIG. 1 to an open position as indicated by the broken lines in FIG. 2. A driving pawl 18 is pivotally connected about pin 4a carried on the driving disc 4 to actuate the shutter blade driving ring 15. The free end of the driving pawl 18 cooperates with the transmission means of the present invention.

According to the invention as illustrated in FIGS. 1 and 2, the transmission means consists of a rocker arm 19 which comprises a single lever in order to obtain a simple construction requiring very few structural members. As shown, one end of the rocking member 19 is pivotally connected directly to the driving ring 15 by means of a pin 20. The other end of the rocker arm 19 is positively connected with the driving pawl 18 by means of the driving pawl coupling jaws 18a which engage with the associated driving pin 19a fixed to lever 19. The driving pawl jaws 18a are maintained in engagement with the driving pin 19a by means of a spring 21 acting on the free end of the driving pawl 18.

A two-armed adjusting lever 23 is rotatably disposed about a fixed axis 22 connected to base plate 2 and said lever is operatively associated with the rocker arm 19. An articulated pin 23a is connected to one end of the adjusting lever and guide pin 23b is connected to the other end of the adjusting lever. According to the present invention the articulated pin 23a of the adjusting lever 23 is engageably received in a slot 19b, which consists in a segment of an arc formed intermediate the ends of rocker arm 19. Accordingly, pin 23a forms an adjustable axis of rotation for the rocker arm 19.

A cam 25, adapted to receive the pin 23b of lever 23, is provided on the ring-type diaphragm setting member 32a of the shutter mechanism to support the adjusting lever 23. The construction of the cam 25 as well as its arrangement with respect to the position of the adjusting lever 23 is such that the adjusting lever, when actuated, pivots about its fixed axis 22 immediately upon rotating movement of the diaphragm setting member 32a in either direction. For the reason that rotation of the adjusting lever 23 necessarily produces a displacement of the articulated pin 23a in the slide 19b, the lever and the transmission ratios of the rocker arm 19 may be varied as desired in response to the setting motion of the diaphragm setting member 32a. The lever arm "a" disposed between pins 20 and 23a of the rocker arm 19 obtains a maximum value when, as shown in FIGS. 1 and 2, the mark 26 of the diaphragm setting member 32a is positioned opposite the value 2.8 of the diaphragm scale 27. Immediately upon the reversal of the diaphragm setting member 32a to a lower diaphragm value, the articulated pin 23a travels from its uppermost position in slot 19b downwardly, whereupon the lever arm "a" is correspondingly reduced. The lever arm "a" ultimately obtains its minimum value when the mark 26 of the diaphragm setting member 32a is opposite the value 22 of the diaphragm scale 27. In this setting the adjusting lever 23 positions the rocker arm 19 so that the shutter blades 11 swing outwardly to their smallest aperture value.

Further, in accordance with the present invention, an angular stop 31 is rotatably positioned about a fixed axis 30. The stop is variable in response to the setting motion of the diaphragm setting member 32a in order that it be operatively associated with the shutter blade driving ring 15. The stop 31 limits the rotary motion of the shutter blade driving ring 15 at the moment of its reversal. To accomplish this result a pin 31a is provided on one end of the angular stop 31. As shown, pin 31a is adapted to be guided in a cam 32 positioned on the diaphragm setting member 32ª. By this construction the cam determines the respective setting positions of the stop 31. The other arm 31b of the stop 31 projects into the path of motion of a pin 33 carried by the shutter blade driving ring 15. It will therefore be understood that the position of stop 31 and pin 33 of driving ring 15 are rendered operative only if the shutter blade driving ring 15, has a tendency to override its actual point of reversal, which point of reversal is determined by the aperture setting. For example, the driving ring 15 may develop an overriding tendency due to excessive play between the cooperating movable parts of the assembly. In operation, the limiting stop 31 reliably assures that adverse influences, such as might possibly occur due to production tolerances or through natural wear of the component members, do not effect the operation of the lever and the transmission means.

An example of the present invention herein described operates as follows:

When the intra-lens shutter is in its cocked position the shutter blades 11 are disposed in their closed position, and as shown in FIG. 1, the diaphragm setting member is set with its mark 26, at the largest diaphragm opening value, viz. 2.8. Upon actuation of the release member (not shown), the arresting lever 7 is pivoted against the influence of the spring 9 thereby releasing the cocking and driving disc 4 whereupon the disc 4 runs down in a counterclockwise direction due to the action of the driving spring. During this period the end of the driving pawl 18, which is connected to one end of the rocker arm, oscillates. The rocker arm 19 is therefore first pivoted in a clockwise direction about the articulated pin 23a in the first phase of the motion of the driving disc 4 and returns thereafter to its starting position in the second phase of the movement of the driving disc. The reciprocating motion of the rocker arm 19 is transmitted via the driving ring 15, to the shutter blades 11. The shutter blades 11 swing out into the open position shown in FIG. 2 during one rotary motion of the rocker arm 19 and thereafter return to the closed position during the return motion of the rocker arm. If necessary, the rotary motion of the shutter blade driving ring 15 may be limited by the additional stop 31 which cooperates with pin 33 of the driving ring 15.

When the diaphragm aperture setting is less than that illustrated in FIGS. 1 and 2, and it is desired to swing the shutter blades 11 outwardly during the running down motion of the shutter, the only requirement is to rotate the diaphragm setting member 32a in a counterclockwise direction until its mark 26 is disposed opposite the desired diaphragm value of the scale 27. In response to this rotary motion of the diaphragm setting member 32a, the adjusting lever 23, one end of which is guided by cam 25 of the diaphragm setting member 32a, moves about its fixed pivot 22 in such fashion that the articulated pin 23a travels downwardly in slide 19b. After resetting the diaphragm setting member 32a the articulated pin 23a again functions as the axis of rotation whereby the movement of the rocker arm 19 and the extent of the reciprocating rotary motion of the shutter blade driving ring 15 is determined by the adjustment in the transmission ratio of the rocker arm 19.

The largest diaphragm setting value of 2.8 is obtained when the articulated pin 23a, as shown in FIGS. 1 and 2, engages the outer limiting edge of the slide 19b and the smallest diaphragm aperture value of 22 is obtained when the articulated pin 23a engages the inner limiting edge of the slide 19b.

Figure 3:
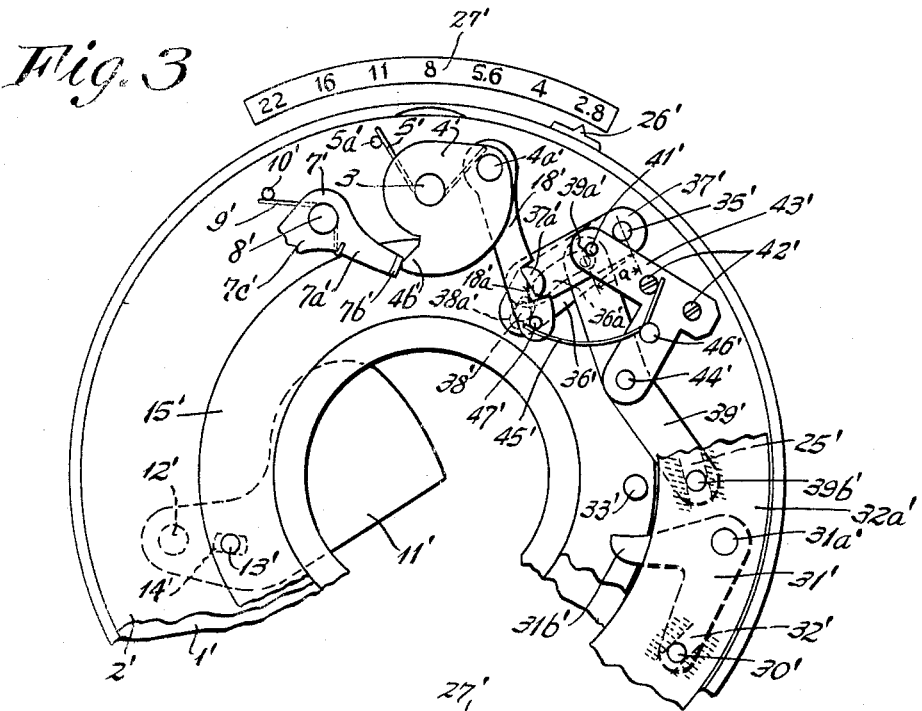
FIG. 3 is the modified form of the invention incorporating a two-part transmission means illustrated in the cocked position at the largest diaphragm setting value 2.8 and with the shutter blades in the closed position.
Figure 4:
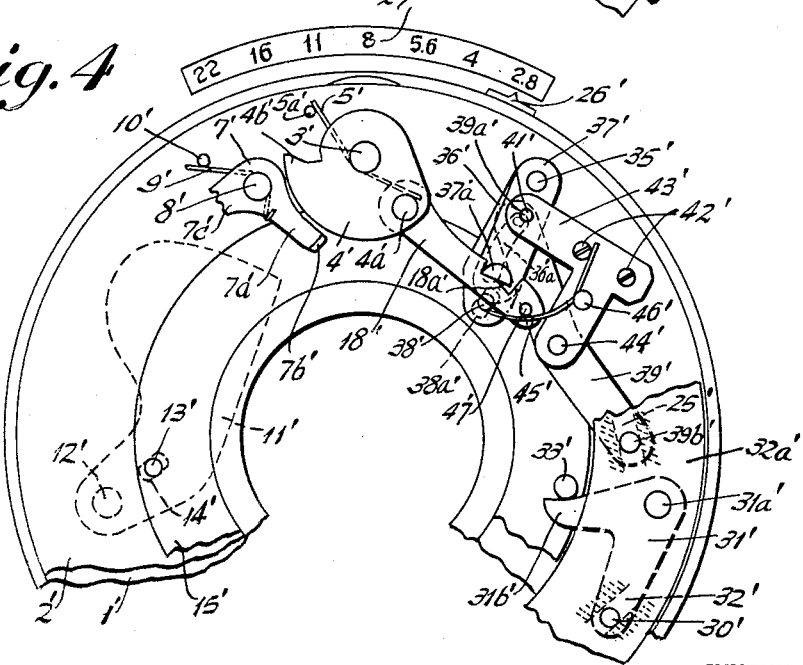
FIG. 4 is a view similar to that of FIG. 3 but illustrating the shutter in its half run-down position.

A modified form of the present invention is illustrated in FIGS. 3 and 4 in which the rocker member of the transmission means comprises two arms 36' and 37' which are pivotally connected to each other at one end by a pin 35'. As shown, the free end of arm 36' is connected to the shutter blade driving ring 15' by a pin 38' and cooperating slot 38a'. The driving pawl 18' of the cocking and driving disc 4' engages the free end of the forwardly located arm 37'. Arm 36' of the rocker member is articulately connected to the shutter blade driving ring 15' and is provided with a slot 36a' which accommodates an articulated pin 39a' carried by a two-armed adjusting lever 39'. The lever 39' is so constructed as to enable the adjustment of the position of pin 39a' in slide 36a'. Arm 37' of the rocker member cooperates with the driving pawl 18' and is pivotally positioned about a fixed pin 41'. An angular bearing plate 43' is fixed to the base plate 2' of the shutter by means of screws or rivets 42'. One end of the bearing plate 43' carries a pivot pin 41' which acts to position the rocker arm 37'. The two-armed adjusting lever 39' pivots about a fixed pin 44' disposed on the other end of the bearing plate 43'. While the distance between the fixed bearing pin 41' and the articulated pin 35' connecting rocker arms 36', 37' is always constant, the lever arm "a" formed by the articulated pin 35' and the articulated pin 39a' is variable in response to the setting of the adjusting lever 39'. This is attained by the adjusting lever 39' being guided at one end by means of a pin 39b' engaging a cam 25' of the diaphragm setting member 32a'. Therefore, when the mark 26' is set at a diaphragm aperture value smaller than the value 2.8, the adjusting lever 39' will rotate or pivot in a counterclockwise direction about pivot 44'. When this occurs, the articulated pin 39a' guided in slot 36a' moves towards the lens axis whereby the lever arm "a" controlling the transmission ratio is steadily increased. The maximum value of the lever arm "a" is attained when the mark 26' coincides with the diaphragm value 22', i.e. when the articulated pin 39a' in the slot 36a' has been moved in the direction towards the lens axis to such an extent that it engages the inner limiting edge of the slot 36a'.

A spring 45' is provided to maintain the operative connection between the coupling jaws 18a' of pawl 18' and the driving pin 37a' of arm 37'. As shown, the spring 45' is mounted on pin 46' carried by the carrier 43'. The spring 45' is anchored at one end by a screw 42' and at its other end by a rivet 47' connected to the driving pawl 18'.

A stop 31' is also provided for additionally limiting the opening motion of the shutter blades 11'. The stop is variable in response to the setting motion of the diaphragm setting member 32a'. The stop 31' comprises a two-armed angular or bell crank type lever pivoted about pin 31a'. One arm 31b' projects into the path of pin 33' carried on the shutter blade driving ring 15'. The other arm carries a pin 30' which engages a cam 32' of the diaphragm setting member 32a'. The cam 32' is so constructed that upon rotation of the diaphragm setting member 32a', the arm 31b' located in the path of motion of pin 33', occupies a position which corresponds to the respective reversal points of the driving ring 15'. The movement of the driving ring 15' is therefore determined by the diaphragm value that has been set during the running down motion of the driving disc 4'.

The operation of the modified form of the present invention shown in FIGS. 3 and 4 is as follows:

As shown in FIG. 3, the component parts are illustrated in their cocked position and set for the largest diaphragm value (2.8). When the release member (not shown) is actuated the driving disc 4' is released. The running down of the driving disc 4' in a clockwise direction, via the driving pawl 18' imparts an oscillating movement to the arm 37' about fixed pivot 41', and also causes arm 36' to pivot back and forth about the articulated axis defined by pin 39a'. The articulated pin 35' connecting the two arms 36' and 37' moves in an arcular path. The arm 36', which is articulately connected to the shutter blade driving ring 15', moves the ring 15' first in a clockwise direction during the first phase of the movement of the driving member 4' motion to open the shutter blades 11'. Thereafter, the movement of the arm 36' causes the return of the driving ring 15', as well as the shutter blades 11' pivotally connected thereto, to the starting position during the second phase of the movement of the driving member 4'. Accordingly, the angular displacement or the oscillating rotary motion of the shutter blade driving ring 15' is dependent on the respective transmission ratio as determined by the position of its articulated pin 39a' carried by the adjusting lever 39' in slot 36a' of the arm 36'.

In this embodiment the stop 31' serves as an additional limitation upon the rotary motion of the shutter blade driving ring 15'. The operation of stop 31' is similar to that described with reference to the stop 31 of the embodiment shown in FIGS. 1 and 2.

While the present invention has been described for illustrative purposes by reference to certain examples thereof, it should be understood that the invention is in no way limited by the details set forth as variations and modifications thereof may be made without departing from the spirit of the invention and the scope of the appended claims.

I claim:

1. In a photographic intra-lens shutter, a combination of a shutter housing having a base plate, a series of shutter blades pivotally mounted to said base plate, a rotatable shutter blade driving ring operatively connected to each of said blades for swinging said shutter blades between operative and inoperative positions upon rotation thereof to define an aperture, drive means including a driving pawl, a variable transmission means including a rocking lever having one end thereof pivotally connected to said shutter driving ring and having its other end connected to said driving pawl, means disposed intermediate the ends of said rocking lever for varying the pivot point about which said rocking lever is rotated, said latter means including an adjusting lever pivotally connected about a fixed pivot intermediate the ends thereof to said base plate, a pin connected to one end of said adjusting lever, said pin being articulately received within a slot formed intermediate the ends of said rocking lever, a diaphragm setting member operatively connected to the other end of said adjusting lever whereby said adjusting lever is pivoted about its fixed pivot in response to the setting of said diaphragm setting member to effect displacement of said pin within said slot accordingly to thereby vary the ratio of transmission between the shutter drive means and said shutter driving ring, a stop means operable to positively limit the rotary motion of said driving ring at the moment of its reversal, said stop means including a two-armed angled lever pivoted intermediate the ends thereof at said base plate, with the first arm to said angled lever overlying said driving ring, a stop pin connected to said driving ring for moving into engagement with said first arm at the limit of the rotary motion of said driving ring, and means on the second arm of said angled lever responsive to the setting of said diaphragm setting member for adjusting the position of said first arm relative to said stop pin.

2. A photographic intra-lens shutter comprising a housing having a base plate, shutter blade driving ring, a series of shutter blades operatively connected to said shutter blade driving ring for swinging between operative and inoperative positions, and a shutter drive means including a driving pawl and means connected thereto to operate said pawl reciprocatingly for imparting a reciprocating motion to said shutter driving ring during the running down of an exposure, the improvement of a variable transmission means interconnecting said drive means to said shutter driving ring, said transmission means including a rocking member articulately connected to one end of said driving ring and connected at the other end to said driving pawl of said shutter drive means, an adjusting lever pivotally mounted at an intermediate point thereof about a fixed pivot on said base plate, one end of said adjusting lever being adjustably connected to said rocking member intermediate the ends thereof, a diaphragm setting member, and the other end of said adjusting lever being connected to said diaphragm setting member so that the position of said adjusting member is influenced by the setting of said diaphragm setting member.

3. In a photographic intra-lens shutter, a combination of a shutter housing having a base plate, a series of shutter blades pivotally mounted to said base plate, a rotatable shutter blade driving ring operatively connected to each of said blades for swinging said shutter blades between operative and inoperative positions upon rotation thereof to define an aperture, drive means for effecting rotation of said driving ring, said driving means including a driving pawl and means to impart a reciprocating movement to said pawl, a variable transmission means including a rocking lever having one end thereof pivotally connected to said shutter driving ring and having its other end connected to said driving pawl, means disposed intermediate the ends of said rocking lever for varying the pivot point about which said rocking lever is rotated, said latter means including an adjusting lever pivotally connected about a fixed pivot intermediate the ends thereof to said base plate, a pin connected to one end of said adjusting lever, said pin being articularly received within a slot formed intermediate the ends of said rocking lever, a diaphragm setting member operatively connected to the other end of said adjusting lever whereby said adjusting lever is pivoted about its fixed pivot in response to the setting of said diaphragm setting member to effect displacement of said pin within said slot accordingly to thereby vary the ratio of transmission between the shutter drive means and said shutter driving ring.

4. In a photographic intra-lens shutter, a combination of a shutter housing having a base plate, a series of shutter blades pivotally mounted to said base plate, a rotatable shutter blade driving ring operatively connected to each of said blades for swinging said shutter blades between operative and inoperative positions upon rotation thereof for defining a diaphragm aperture, drive means for effecting rotation of said driving ring, said driving means including a driving pawl, a variable transmission means interconnecting said driving means to said shutter driving ring for controlling the amount of angular rotation of said driving ring and the swinging action of the shutter blades connected thereto, said variable transmission means including a pair of rocking arms, said rocking arms having adjacent end portions thereof pivotally connected, the free end of one of said rocking arms being connected to the driving ring, and the free end of the other rocking arm being operatively connected to the driving pawl of said driving means, a pin and slot connection connecting the free end of said one rocking arm to the shutter blade driving ring whereby the position of said pin in said slot is rendered variable, and diaphragm setting means for varying the ratio of said transmission means to control the swinging movement of said shutter blades, said latter means including a slot formed intermediate the ends of said one rocking arm, an adjusting lever pivoted intermediate the ends thereof to said base plate, a pin connected to one end of said adjusting lever, said pin being articularly received within said slot, means connected to the other end of said adjusting lever for adjusting the position of said pin within said slot in response to the setting of said diaphragm setting means, a bearing plate fixed to said base plate, said bearing plate having a pin connected thereto, said bearing plate pin defining a fixed pivot for said other rocking arm.

References Cited by the Examiner

UNITED STATES PATENTS

| | | | |
|---|---|---|---|
| 382,858 | 5/88 | Bausch | 95—63 |
| 436,404 | 9/90 | Dallmeyer | 95—63 |
| 524,670 | 8/94 | Rudolph et al. | 95—63 |
| 761,756 | 6/04 | Brueck | 95—63 |
| 798,595 | 9/05 | Brueck | 95—63 |

JOHN M. HORAN, *Primary Examiner.*

NORTON ANSHER, *Examiner.*